United States Patent [19]
Kobayashi

[11] Patent Number: 5,990,213
[45] Date of Patent: Nov. 23, 1999

[54] FLAME RESISTANT POLYESTER RESIN COMPOSITION

[75] Inventor: Toshikazu Kobayashi, Yokohama, Japan

[73] Assignee: E. I. du Pont de Nemours and Company, Wilmington, Del.

[21] Appl. No.: 08/945,891

[22] PCT Filed: May 8, 1996

[86] PCT No.: PCT/US96/06532

§ 371 Date: Nov. 5, 1997

§ 102(e) Date: Nov. 5, 1997

[87] PCT Pub. No.: WO96/35754

PCT Pub. Date: Nov. 14, 1996

[30] Foreign Application Priority Data

May 9, 1995 [JP] Japan ..................................... 7-110804

[51] Int. Cl.⁶ ............................... C08K 5/09; C08K 5/10; C08K 5/12; C08K 5/05

[52] U.S. Cl. .......................... 524/288; 524/316; 524/371; 524/393; 524/469; 524/502

[58] Field of Search .................................. 524/288, 412, 524/316, 371, 393, 469, 502

[56] References Cited

FOREIGN PATENT DOCUMENTS

| 90-365437 | 4/1989 | Japan | C08L 67/02 |
|---|---|---|---|
| 2263862 | 10/1990 | Japan | C08K 5/03 |
| WO 85/03718 | 8/1985 | WIPO | C08L 67/02 |
| WO 89/03854 | 5/1989 | WIPO | C08K 5/12 |
| WO 95/18179 | 7/1995 | WIPO | C08K 5/05 |

*Primary Examiner*—Kriellion Sanders

[57] ABSTRACT

Flame resistant polyester resin composition comprising a polyester matrix resin containing a polyalkylene oxide, a brominated flame retardant, and a brominated dialkyl phthalate which exhibits low melt viscosity, excellent flow, improved welding strength and resistance to thermal shock.

3 Claims, No Drawings

FLAME RESISTANT POLYESTER RESIN COMPOSITION

BACKGROUND OF THE INVENTION

The present invention relates to a flame resistant polyester resin composition which is suitably used as a potting agent for transformers and the like, and more specifically, to a flame resistant polyester resin composition that has low melt viscosity, excellent flow, improved welding strength, along with excellent impact strength, elongation, water resistance, and resistance to thermal shock.

It is an objective of this invention to provide a flame resistant polyester resin composition which is used in potting agents for electrical and electronic parts, particularly as a potting agent for transformers, which has low melt viscosity, excellent flow, improved welding strength, as well as excellent impact resistance, elongation, water resistance, and resistance to thermal [heat] shock.

SUMMARY OF THE INVENTION

The present invention, which achieves the above objectives, is a flame resistant polyester resin composition and comprises:
(A) 30–92% by weight of a polyester resin;
(B) 4–20% by weight of an ethylene copolymer represented by the formula E/x/y where E is ethylene; x is a group derived from the formula:

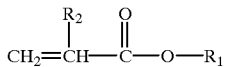

wherein; $R_1=C_2-C_8$ alkyl, $R_2$=H, $CH_3$ or $C_2H_5$; y is glycidyl methacrylate or glycidyl acrylate; E is 40–90% by weight; x is 10–40% by weight; and y is 0.5–20% by weight;
(C) 2–30% by weight of a brominated flame retardant; and
(D) 2–20% by weight of a brominated dialkyl phthalate.

DETAILED DESCRIPTION

The polyester resin in this invention is selected from the group consisting of polyethylene terephthalate, polyethylene terephthalate/polybutylene terephthalate blends, polyethylene terephthalate/polybutylene terephthalate copolymers, and blends thereof, where the blends and copolymers comprise at least 70% by weight of ethylene terephthalate units and is a polyethylene terephthalate having an inherent viscosity of 0.4 in 3:1 by volume ratio of methylene chloride and trifluoroacetic acid.

The polyester resin may be replaced by a polyester matrix resin comprising polyalkylene oxide soft segment components. The polyester matrix resin comprising polyalkylene oxide soft segment components comprise 1–15 parts by weight of polyalkylene oxide soft segments of a molecular weight of 200–3,250 per 100 parts by weight of a polyester resin. The polyalkylene oxide is preferably polyethylene oxide and is incorporated in the polyethylene terephthalate polymer chain. If a polyethylene terephthalate/polybutylene terephthalate blend and/or a polyethylene terephthalate/polybutylene terephthalate copolymer is used, the polyalkylene oxide can be incorporated into the polymer by adding polyethylene terephthalate to a polybutylene terephthalate/polyalkylene oxide or by directly copolymerizing a polyethylene terephthalate, polybutylene terephthalate, and a polyalkylene oxide by directly adding the polyalkylene oxide to the polyethylene terephthalate/polybutylene terephthalate copolymer. The polyalkylene oxide has a molecular weight in the range of 200–3,250, preferably 600–1,500. Incorporating the polyalkylene oxide soft segments can accelerate the rate of crystallization.

The ethylene copolymer used in this invention is an ethylene copolymer represented by the formula E/x/y, where E is ethylene; x is a group derived from the formula:

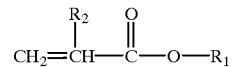

wherein; $R_1=C_2-C_8$ alkyl, $R_2$=H, $CH_3$ or $C_2H_5$; y is glycidyl methacrylate or glycidyl acrylate; E is 40–90% by weight; x is 10–40% by weight; and y is 0.5–20% by weight. Preferably, $R_1$ in the above formula is a C4 alkyl, $R_2$ is H, and y is glycidyl methacrylate. It is not preferred to have a polymer content of less than 4% by weight, which fails to improve water resistance or to have a content greater than 40% by weight, which reduces heat resistance.

Brominated flame retardants which are used in this invention are known brominated flame retardants such as polydibromo styrene, polytribromo styrene, polypentabromo styrene, decabromodiphenyl, tetrabromodiphenyl, hexabromodiphenyl ether, octabromodiphenyl ether, decabromodiphenyl ether, tetrabromodiphenyl sulfide, polypentabromo benzyl acrylate, brominated phenoxy resin, epoxy terminated brominated phenoxy resin, and the like. The contents should be 2–30% by weight, preferably 5–15% by weight. A level less than 2% by weight will not achieve flame resistance sufficient to be rated at V-0 (UL 94); while a level greater than 30% by weight will reduce physical properties, making either extreme not preferred.

Brominated dialkylphthalates which are used in this invention are preferably brominated dialkylphthalates containing C5–25 alkyl groups, such as tetrabromodioctylphthalate. The contents should be 5–20% by weight, preferably 7–15% by weight. A level less than 5% by weight will tend to increase melt viscosity, and influence resistance to thermal shock. A level greater than 20% by weight can influence mechanical properties.

Also in this invention, up to 120 parts by weight of an inorganic reinforcement agent may be compounded further per 100 parts by weight of a flame resistance polyester resin composition comprising the above components (A), (B), (C) and (D). Inorganic reinforcement agents include known reinforcing agents, such as glass fibers, mica, whiskers, talc, calcium carbonate, synthetic resin fibers, and the like. Adding more than 120 parts by weight of an inorganic reinforcing agent will cause problems in the molded articles in terms of surface appearance, warp, and so on.

Polyester resin compositions in this invention may further be compounded with plasticizers, such as polyethylene glycol 400, bis(2-ethylhexanoate, methoxy polyetheylene glycol 550 (2-ethylhexanoate), and tetraethylene glycol bis (2-ethylhexanoate) and the like, as well as nucleating agents which include known sodium or potassium salts of carboxyl-group-containing organic polymers, sodium salts of long chain fatty acids, sodium benzoate, and the like. Part or all of the polyester may be replaced by a sodium or potassium terminated polyester. Within the extent of not adversely affecting their properties, the polyester resin compositions of this invention may be compounded. In addition to the above components, additives such as a heat stabilizer, antioxidants, dyes, pigments, mold release agents, UV absorbers, or the like, may be used.

The flame resistant polyester resin composition of this invention can be manufactured by using a melt kneading method by means of kneading equipment, such as commonly used Banbery mixers, extruders, kneaders, and the like. As to the sequence of kneading in the manufacture of the flame resistant polyester resin compositions of this invention, individual components may be kneaded in one shot, in addition, a filler may be fed from a side feeder.

The flame resistant polyester resin composition of this invention which contains not only a brominated flame retardant and a specific ethylene copolymer, but also a brominated dialkylphthalate which functions both in terms of flame resistance and plasticizing effect, will provide flame resistance, and excellent impact resistance, resistance to heat shock, and water resistance.

The present invention is now specifically described by the following examples which, however, do not limit the scope of this invention:

EXAMPLES

Individual components give in Table 1 and Table 2 were premixed 20 minutes in a tumbler and melt kneaded at a temperature of 290° C. using a twin screw extruder (Toshiba Tem 35B) to generate resin compositions. The resultant resin compositions were molded into 13 mm×130 mm×3.2 mm test pieces according to ASTM D 638. These test pieces were used to measure their mechanical properties. The measurement was based on the following test procedures:
Tensile Strength: ASTM D 638-58 T
Elongation: ASTM D 638-58 T
Flexual Modulus: ASTM D 790-58 T Pressure Cooker Test (PCT), a 3.2 mm thick dumbbell test piece is placed in the water of a pressure cooker containing water, heated under pressure to bring the temperature to 121° C. and 2 atmospheres pressure. The test piece, on which tensile strength is measured, is removed 50 hours later. A comparison is made to its tensile strength before the test is made to give an evaluation in terms of % retention of the tensile strength.

Heat Shock Test

A 1 mm thick resin film is formed on a metal piece 42 mm×25 mm×10 mm made of stainless steel and is used as a test piece. The test piece is placed in a thermal shock tester which repeats the conditions of −40° C. and 1 hour and the conditions of 140° C. and 1 hour, thereby measuring the number of cycles until the test piece forms any cracks, the data being used to evaluate thermal shock sensitivity.

Melt viscosity was measured at 280° C. on a Capillarograph (manufactured by Toyo Seiki).

Flame Resistance Test

This was tested on a 1/32 inch thick (about 0.8 mm thick) specimen according to UL 94.

These results are shown in Tables 1 and 2.

The following components were used in these examples and comparative examples:

PET, as a polyester resin component: Polyethylene terephthalate (manufactured by E. I. du Pont de Nemours and Company) with an inherent viscosity of about 0.67–0.58.
Inorganic reinforcing agent: Glass fibers.
Brominated dialkylphthalate: TBDOP (tetrabromodioctylphthalate).
Plasticizer: polyethylene glycol 400 bis (2-ethylhexanoate).
Ethylene Copolymer: Ethylene/butylacrylate/glycidyl methacrylate (manufactured by E. I. du Pont de Nemours and Company) as an E/x/y component.
Brominated Flame Retardant 1: TRIBR-PS (polytribromostyrene: PyroCheck®, 68PB manufactured by the Ferro Corporation).
Brominated Flame Retardant 2: TBBA-epoxy (epoxy terminated tetrabromobisphenol A polymer).
Brominated Flame Retardant 3: Brominated PC (brominated polycarbonate).
Brominated Flame Retardant 4: EBPBDP (ethylene-bis (pentabromodiphenyl).
Flame Retardant: $Sb_2O_3$ (antimony trioxide).

TABLE 1

| | EXAMPLES | | | | | | | |
|---|---|---|---|---|---|---|---|---|
| | 1 | 2 | 3 | 4 | 5 | 6 | 7 | 8 |
| PET (% by wt.) | 45.5 | 40.5 | 42.5 | 42.5 | 43.5 | 45.5 | 35.5 | 48.5 |
| Inorganic Reinforcing Agent (% by wt) | 30 | 30 | 30 | 30 | 30 | 30 | 45 | 30 |
| Brominated dialkylphthalate (% by wt) | 8 | 8 | 8 | 8 | 8 | 5 | 6 | 8 |
| Plasticizer (% by wt.) | | 3 | | | | | | |
| Ethylene copolymer (% by wt.) | 5 | 5 | 5 | 5 | 5 | 5 | 4 | 5 |
| Brominated Flame Retardant 1 (% by wt) | 10 | 12 | | | 6 | 13 | 8 | |
| Brominated Flame Retardant 2 (% by wt) | | | 13 | | 6 | | | |
| Brominated Flame Retardant 3 (% by wt) | | | | 13 | | | | |
| Brominated Flame Retardant 4 (% by wt) | | | | | | | | 7 |
| Flame Retardant (% by wt) | 1.5 | 1.5 | 1.5 | 1.5 | 1.5 | 1.5 | 1.5 | |
| PCT (%) | 65 | 62 | 68 | 63 | 66 | 64 | 63 | 64 |
| Thermal Shock Cycle (Cycles) | 400 | 400 | 400 | 400 | 400 | 400 | 400 | 400 |
| Melt Viscosity (1/1000 sec) | 130 | 120 | 150 | 140 | 140 | 135 | 150 | 110 |
| Flame Resistance | V-0 | V-0 | V-0 | V-0 | V-0 | V-0 | V-0 | V-0 |
| Tensile Strength (kg/cm$^2$) | 1100 | 1060 | 1250 | 1210 | 1120 | 1220 | 1350 | 1220 |
| Elongation (%) | 3.1 | 3.3 | 3.2 | 3.1 | 3.2 | 3.1 | 2.6 | 3.1 |
| Flexural Modulus (kg/cm$^2$) | 109000 | 105000 | 106000 | 110000 | 114000 | 119000 | 138000 | 121000 |

TABLE 2

|  | 1 | 2 | 3 | 4 | 5 |
|---|---|---|---|---|---|
| PET (% by wt.) | 52.5 | 47.5 | 40.5 | 45.5 | 29.5 |
| Inorganic Reinforcing Agent (% by wt) | 30 | 30 | 30 | 30 | 30 |
| Brominated dialkylphthalate (% by wt) | 6 | 2 | 23 | | |
| Plasticizer (% by wt.) | | | | | 8 |
| Ethylene copolymer (% by wt.) | | 5 | 5 | 5 | 5 |
| Brominated Flame Retardant 1 (% by wt) | 10 | 14 | | | 18 |
| Brominated Flame Retardant 2 (% by wt) | | | | 18 | |
| Brominated Flame Retardant 3 (% by wt) | | | | | |
| Brominated Flame Retardant 4 (% by wt) | | | | | |
| Flame Retardant (% by wt) | 1.5 | 1.5 | 1.5 | 1.5 | 1.5 |
| PCT (%) | 38 | 70 | 60 | 72 | 58 |
| Thermal Shock Cycle (Cycles) | 180 | 80 | 350 | 120 | 400 |
| Melt Viscosity (1/1000 sec) | 100 | 250 | 60 | 310 | 78 |
| Flame Resistance | V-0 | V-0 | V-0 | V-0 | V-1 |
| Tensile Strength (kg/cm$^2$) | 1380 | 1250 | 550 | 1400 | 710 |
| Elongation (%) | 2.1 | 3.2 | 2.2 | 2.8 | 2.2 |
| Flexural Modulus (kg/cm$^2$) | 125000 | 106000 | 68000 | 129000 | 82000 |

Examples 1–8 all had tensile strength retentions of 60% or greater after 50 hours by a PCT test, a number of thermal shock cycles of at least 350, melt viscosities not more than 150 ($1/1000$ sec), a tensile strength of at least 1000 kg/cm$^2$ elongations of at least 2.0%, and a flexual modulus of at least 90,000.

On the other hand, the comparative example lacking an ethylene copolymer has a low tensile strength retention at 38% after 50 hours with PCT. Comparative Example 2 which has as little as 2% TBDOP, gave too high a melt viscosity at 250 ($1/1000$ sec), thereby showing poor flow in molding, and a thermal shock cycle number which is low at 80, being inferior in resistance to thermal shock. Comparative Example 3 which uses too much TBDOP at 23% is inferior in physical properties, such as tensile strength, elongation, flexural modulus and so on. Comparative Example 4 which contains 0% TBDOP has too high a melt viscosity, resulting in poor flow in molding, gives a low thermal shock cycle number at 120, being inferior in resistance to thermal shock. Comparative Example 5, which uses 0% TBDOP, has too much plasticizer, resulting in poor physical properties and poor flame resistance with the flame resistance not reaching V-0.

The polyester resin composition of this invention, although being flame resistant, has excellent flow, mechanical properties, resistance to thermal shock and water resistance, so that it can be suitably used as a potting agent for electrical and electronic parts. In particular, when used in transformers, it can pot without damaging the interior coils and can satisfactorily perform under further aggressive service environments.

What is claimed is:

1. A flame resistant polyester resin composition comprising:

(A) 30–92% by weight of a polyester resin;
    (B) 4–20% by weight of an ethylene copolymer represented by the formula E/x/y where E is ethylene; x is a group derived from the formula:

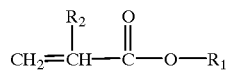

wherein; $R_1=C_2-C_8$ alkyl, $R_2$=H, $CH_3$ or $C_2H_5$; y is glycidyl methacrylate or glycidyl acrylate; E is 40–90% by weight; x is 10–40% by weight; and y is 0.5–20% by weight;

(C) 2–30% by weight of a brominated flame retardant selected from the group consisting of brominated polystyrenes, brominated diphenyls. brominated diphenyl ethers, brominated diphenyl sulfides, brominated benzyl acrylates, brominated phenoxy resins, and epoxy terminated brominated phenoxy resins; and
    (D) 5–20% by weight of a brominated dialkyl phthalate.

2. A flame resistant polyester resin composition as set forth in claim 1 further comprising up to 120 parts by weight of an inorganic reinforcing agent per 100 parts by weight of the total weight of the preceding components (A), (B), (C), and (D).

3. A flame resistant polyester resin composition as set forth in claim 1, wherein the component (A) polyester resin is a polyester matrix which comprises 1–15 parts by weight of polyalkylene oxide soft segments having a number average molecular weight of 200–3,250 per 100 parts by weight of a polyester resin selected from the group consisting of polyethylene terephthalate, polyethylene terephthalate/polybutylene terephthalate blends, polyethylene terephthalate/polybutylene terephthalate copolymers, and blends thereof (where blends and copolymers comprise at least 70% by weight of ethylene terephthalate units).

* * * * *